July 31, 1928.

P. FRUHOF 1,679,303

BELT COUPLING

Filed Aug. 29, 1927

Phillip Fruhof
INVENTOR

BY Victor J. Evans
ATTORNEY

WITNESS:

Patented July 31, 1928.

1,679,303

UNITED STATES PATENT OFFICE.

PHILLIP FRUHOF, OF NORFOLK, NEBRASKA.

BELT COUPLING.

Application filed August 29, 1927. Serial No. 216,249.

This invention relates to a belt coupling, the general object of the invention being to provide a coupling made in the form of a hinge, with means whereby the two parts of the device can be easily and quickly attached to the ends of a belt.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
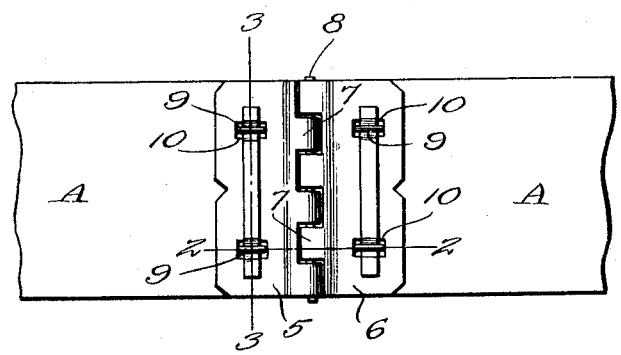
Figure 1 is a plan view of portion of a belt, showing the invention in use.
Figure 2:
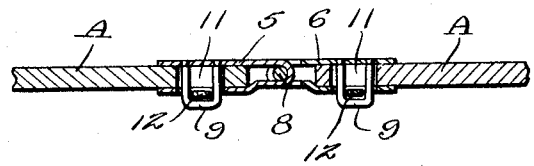
Figure 2 is a section on line 2—2 of Figure 1.
Figure 3:
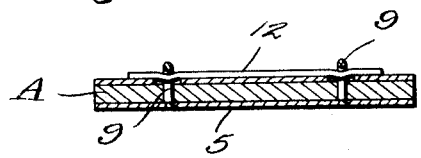
Figure 3 is a section on line 3—3 of Figure 2.
Figure 4:
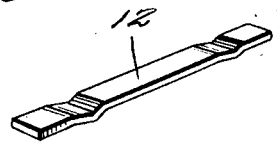
Figure 4 is a view of one of the fastening strips.

As shown in these views the device comprises a pair of loop members 5 and 6 which have their central portions cut to leave the spaced strips 7 which, when the member is bent upon itself, form hinge barrels for the hinge pin 8, it being understood that the spaces between the barrels of one member receive the barrels on the other member. Each member is adapted to be placed over the end of a belt, such as shown at A, and a pair of staples 9 is fastened to one limb of each member while the opposite limb is formed with a pair of slots 10 to receive these staples. Each end of the belt is also provided with a pair of slots 11 through which the staples pass.

After the belt end has been placed between the two limbs of a member, the staples are passed through the slots 11 and through the slots 10 in the other limb of the member and then a fastening strip 12 is passed through the staples to hold the parts fastened together. Then the two members of the coupling are fastened together by passing the pin 8 through the barrels.

Thus it will be seen that I have provided a belt coupling which can be easily and quickly put in place and removed and which will be flexible enough to permit the belt to pass around pulleys and the like without interference on the part of the device.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A belt coupling comprising a pair of members hingedly connected together, each member being formed with two limbs to receive a belt end between them, an eye forming member carried by one limb, the other limb having a slot therein to receive the eye forming member and the belt end also having a slot therein to receive said member and a member adapted to be passed through the end of the eye forming member to hold the parts assembled.

2. A belt coupler comprising a pair of members each formed of metal looped upon itself with the central portion of the metal cut to leave spaced strips, which when the metal is folded, forms hinge barrels, staples on one limb of each member and the other limb having holes through which the staples pass, after passing through holes in a belt end and a strip adapted to pass through the staples after they have been passed through the second member to hold the parts assembled.

In testimony whereof I affix my signature.

PHILLIP FRUHOF.